United States Patent
Brisebois (10) Patent No.: US 10,348,849 B2
(45) Date of Patent: Jul. 9, 2019

(54) AUTOMATIC DELIVERY OF MEDIA CONTENT TO A DEVICE

(71) Applicant: AT&T MOBILITY II LLC, Atlanta, GA (US)

(72) Inventor: Arthur Richard Brisebois, Cumming, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 260 days.

(21) Appl. No.: 15/050,128

(22) Filed: Feb. 22, 2016

(65) Prior Publication Data

US 2017/0244801 A1    Aug. 24, 2017

(51) Int. Cl.
  *G06F 15/16* (2006.01)
  *H04L 29/08* (2006.01)
  *H04L 29/06* (2006.01)

(52) U.S. Cl.
  CPC ...... *H04L 67/2842* (2013.01); *H04L 65/4076* (2013.01); *H04L 65/4084* (2013.01); *H04L 67/306* (2013.01)

(58) Field of Classification Search
  CPC .............. H04L 67/2842; H04L 67/306; H04L 65/4076; H04L 65/4084
  USPC ................................................. 709/203–248
  See application file for complete search history.

(56) References Cited

U.S. PATENT DOCUMENTS

| 7,130,616 B2 | 10/2006 | Janik |
| 7,305,691 B2 | 12/2007 | Cristofalo |
| 7,613,792 B2 | 11/2009 | Zervas et al. |
| 8,364,611 B2 | 1/2013 | Tendjoukian et al. |
| 8,412,798 B1 | 4/2013 | Wang |
| 8,789,100 B2 | 7/2014 | Contin et al. |
| 8,893,212 B2 | 11/2014 | Reisman |
| 8,930,358 B2 | 1/2015 | Zito et al. |

(Continued)

FOREIGN PATENT DOCUMENTS

| CA | 2 762 974 A1 | 10/2010 |
| EP | 2025150 A1 | 2/2009 |

(Continued)

OTHER PUBLICATIONS

Rogers, D., et al., "The TV-Trawler Project", International Journal of Imaging Systems and Technology 13.5 (2003), http://espace.library.uq.edu.au/view/UQ:7872/tv-trawler.pdf, 10 pages.

*Primary Examiner* — Moustafa M Meky
*Assistant Examiner* — Thorne E Waugh
(74) *Attorney, Agent, or Firm* — Toler Law Group, PC (57) ABSTRACT

A method includes generating, at a media device, a user profile based on first data received from a portable device. The first data indicates media content sent to a display device of the portable device by an application on the portable device. The method includes recording, via the media device, a media content item from a content source, where the media content item is selected based on the user profile. The method also includes sending the media content item from the media device to the portable device via a local area network. The portable device stores the media content item at a pre-cache memory to enable the portable device to playback the media content item from the pre-cache memory when the portable device is not able to communicate via the local area network.

20 Claims, 4 Drawing Sheets

(56) References Cited

U.S. PATENT DOCUMENTS

| | | | |
|---|---|---|---|
| 9,246,967 B2 * | 1/2016 | Garmark | H04L 65/60 |
| 9,319,445 B2 * | 4/2016 | Garmark | H04L 65/60 |
| 9,635,068 B2 * | 4/2017 | Garmark | H04L 67/42 |
| 2007/0245399 A1 | 10/2007 | Espelien | |
| 2008/0235746 A1 | 9/2008 | Peters et al. | |
| 2010/0031299 A1 * | 2/2010 | Harrang | H04N 21/4104 |
| | | | 725/80 |

FOREIGN PATENT DOCUMENTS

| | | |
|---|---|---|
| GB | 2483120 A | 2/2012 |
| GB | 2519768 A | 5/2015 |

\* cited by examiner

AUTOMATIC DELIVERY OF MEDIA CONTENT TO A DEVICE

FIELD OF THE DISCLOSURE

The present disclosure is generally related to automatic delivery of media content to a device.

BACKGROUND

A media content distribution system (a satellite television system, a cable television system, an internet protocol television system, or combinations thereof) associated with a service provider may provide media content to media devices. The media content may include television content, on-demand content, pay-per-view content, audio content, or other content. A media device may output the media content to an output device (e.g., a display device, an audio system, a haptic system, or a combinations thereof), or store media content received from the media content distribution system.

The media content available from the service provider may be available to certain portable devices, such as a portable device associated with a subscriber. For example, a user of the portable device may download media content to the portable device for later viewing. However, repeatedly downloading new content and deleting old content may be inconvenient for the user. As another example, the media content available from the service provider may be streamed to the portable device via a network (e.g., via the internet or via a mobile communication network). However, streaming media content to the portable device via a mobile communication network may be associated with higher costs than delivery via other networks. Additionally, the quality of the streamed media content is limited by network constraints and may be subject to disruptions.

DETAILED DESCRIPTION

A subscriber of a service provider may be associated with a media device that is configured to access media content from the service provider via a first network (e.g., to enable recording and playback of media content). The media device may include or correspond to a network device (e.g., a server) associated with the service provider, a customer premises equipment device, a set-top box device, a computer system, a gaming device, a television, or combinations thereof. In these examples, the first network may use a relatively low cost medium, such as a digital subscriber line (DSL) connection, a hybrid fiber-coax connection, a fiber connection, or a wide area broadcast connection (such as a direct satellite broadcast or a digital television broadcast). The media device may store recorded content in a memory associated with the media device or the media device may cause the media content to be stored at network-based equipment (e.g., a network digital video recorder) of the service provider.

The subscriber may also be associated with a portable device that is configured to enable communications via a second network, which may or may not be associated with (e.g., supported by) the service provider. For example, the portable communication device may include a smart phone, a tablet computer, a notebook or laptop computer, a vehicle computing system (e.g., an in-car entertainment system), or another portable computing device. In these examples, the second network may use a relatively (as compared to the first network) high-cost medium, such as a wide-area wireless network or a mobile communication network, such as a 3G network, a 4G network, a 5G network, a LTE network, or another mobile communication network. The portable device may also be configured to communicate with the media device via a third network, such as a wireless local area network (e.g., a network compliant with an Institute for Electrical and Electronics Engineers (IEEE) 802.11 standard, such as IEEE 802.11a, IEEE 802.11b, IEEE 802.11g, IEEE 802.11n, etc., or a short-range ad hoc network such as a Bluetooth® network) (BLUETOOTH is a registered trademark of the Bluetooth Special Interest Group).

The portable device may include an application that enables a user of the portable device to retrieve and output media content accessed from the service provider. The application may enable the portable device to control the media device in addition to, or in lieu of, a separate remote control device for the media device. The application may enable the media device to pre-cache media content at a memory of the portable device. The media device may include a recommendation engine. The recommendation engine may analyze information about the user (e.g., a user profile) to generate recommendations regarding media content. For example, the recommendation engine may determine, based on the user profile, that the user is likely to consume a first media content item. In this example, based on the recommendation engine recommending the first media content item, the media device may automatically (e.g., without receiving a request from the user) cause the first media content item to be stored at the memory of the portable device, as described further below.

Additionally, the media device may automatically schedule recording of the first media content item based on the recommendation engine recommending the first media content item. For example, the recommendation engine may generate recommendations based on the user profile and based on a program guide that identifies programs that are to be broadcast (e.g., via the first network) within a particular timeframe (e.g., several days). In this example, the recommendation engine selects recommended content from among the programs that are to be broadcast within the particular timeframe. In another example, the recommendation engine may generate recommendations based on the user profile and information descriptive of a wider range of programs that are to be broadcast within the particular timeframe, such as programs available via on-demand services, or programs identified in a program database. In this example, the recommendation engine selects recommended content and may then search a program guide or other program listing (e.g., an on-demand program listing) to determine whether a program identified in the recommended content is available (e.g., as on-demand or broadcast content) or is scheduled to be made available (e.g., is scheduled to be broadcast within the particular timeframe).

Programs that are identified in the recommended content and that are available may be recorded by the media device. Subsequently, the media device may automatically push the recorded programs, or a sub-set of the recorded programs, to the portable device (e.g., via the third network) to pre-cache media content at the portable device. Thus, the media device may automatically record media content based on recommendations by the recommendation engine. Additionally, at least some of the media content recorded by the media device may be automatically stored at a memory of the portable device while the portable device is able to communicate with the media device via a relative low-cost medium (e.g., the third network). Automatically storing recommended media content at the memory of the portable device makes the recommended media content available for consumption by the user when the portable device is not able to communicate with the media device or the service provider via a low-cost medium (e.g., the third network). For example, the recommended media content may be automatically pre-cached at the portable device while the user (and the portable device) is at home (e.g., overnight). In this example, when the user subsequently leaves home and the portable device is only able to communicate via a wide area wireless network, the user can consume the recommended media content from the memory of the portable device, thereby reducing costs and other concerns associated with streaming the media content via the wide area wireless network.

The user profile may be generated based on media consumed by the user (and/or other similar users) using the media device, using the portable device, using another device, or a combination thereof. For example, when the user consumes media content via the media device or via the portable device while the portable device is in communication with the media device, the media device may maintain a record of which media content items the user consumes. When the user consumes media content via the portable device while the portable device is not in communication with the media device (e.g., when the user is away from home), the portable device may maintain a record of which media content items the user consumes. Subsequently, when the portable device is in communication with the media device, the portable device may provide the record to the media device.

The record or records of media consumed by the user (e.g., usage data) may be used by the media device to generate (or update) the user profile. The user profile may include information indicating when (or where) various media content items were consumed. For example, a first media content item may be indicated to have been consumed at home (e.g., via the media device or via the portable device while the portable device was in communication with the media device via the third network). In this example, a second media content item may be indicated to have been consumed away from home (e.g., via the portable device while the portable device was not in communication with the media device via the third network).

To select media content to pre-cache at the portable device, the recommendation engine may preferentially select media content that the user is likely to consume while away from home. To illustrate, when selecting media content to be pushed to the portable device, the recommendation engine may consider media content items consumed while the user is away from home (e.g., the second content item in the example above). Thus, the recommendation engine may ignore media content items consumed while the user is at home (e.g., the first content item in the example above).

Alternatively, the recommendation engine may use different weights for media content items consumed at home and media content items consumed away from home when determining a likelihood that the user will consume a particular content item while away from home. For example, the recommendation engine may apply a first weight to calculations associated with the first media content item and may apply a second weight to calculations associated with the second media content item. The first weight and second weight may be selected to favor pre-caching media content items at the portable device that are likely to be consumed while the user is away from home (e.g., via the portable device while the portable device is not in communication with the media device via the third network).

In some circumstances, a household may include more than one user and more than one of the users may be associated with a portable device. Generally, in such circumstance, multiple users may use the media device, while each portable device may be frequently or exclusively used by a single user. A remote control device associated with the media device may be used by all members of a household to control the media device. In this situation, a user profile generated based on usage data associated with the remote control device may provide recommendations targeted for all members of the household rather than for a particular member of the household. On the other hand, since the portable device may be predominantly used by one person, a user profile generated based on usage data associated with the portable device may enable the recommendation engine to provide recommendations targeted for the one user of the portable device. Targeting the recommendations to a single user may increase a probability that the single user will choose to view media content recommended for the single user.

Before sending a media content item to be stored at the portable device, the media device may confirm that the portable device is capable of storing the media content item and is prepared to receive the media content item. For example, the media device may send a notification of availability of recommended content to the portable device when recorded recommended content is available for the portable device. In response to the notification, the portable device may determine whether the portable device can store the media content item. For example, a portion of the memory of the portable device may be designated (or partitioned) for storage of pre-cached media content. In this example, the portable device may determine whether the portion of the memory (also referred to as a "pre-cache memory") has enough storage space to store the recommended content. When the pre-cache memory has enough storage space to store the recommended content, the portable device may notify the media device, and the media device may send the recommended content to the portable device for storage. When the pre-cache memory does not have enough storage space to store the recommended content, the portable device may notify the media device, and the media device may not send the recommended content to the portable device. Alternatively, the portable device may clear space in the pre-cache memory, e.g., by deleting other media content items from the pre-cache memory, as described further below. After clearing space in the pre-cache memory, the portable device may notify the media device, and the media device may send the recommended content to the portable device.

When the user of the portable device uses the application, the user may be presented with a selectable option (e.g., an icon or menu option) associated with pre-cached content.

When the user is not at home (e.g., when the portable device is not connected to the media device via the third network), the selectable option may be more prominently displayed (e.g., highlighted or arranged in a more prominent position in a display or menu) to encourage the user to consume the pre-cached content. Selection of the selectable option may cause the portable device to retrieve the media content item from the pre-cache memory and send the media content item to a display device of the portable device for display. Retrieving the media content item from the pre-cache memory may result in increased user satisfaction with the playback as compared to retrieving the media content item via the mobile communication network. Additionally, since the media content item is stored locally on the portable device, playing back the media content item does not adversely affect bandwidth limitations associated with the portable device. For example, the user may avoid incurring extra fees from the service provider for exceeding a bandwidth limit associated with the portable device. Further, playing back the media content from the pre-cache memory may also be beneficial to the service provider by avoiding use of a portion of a limited capacity of the mobile communication network to send the media content item to the portable device. Additionally, since the media device automatically records media content based on the user profile and automatically causes at least some of the recorded media content to be pre-cached by the portable device, the user is able to consume media from the pre-cache memory while the user is away from the media device (e.g., away from home) without planning ahead or interacting with scheduling applications to select the media content.

In an illustrative embodiment, a method includes generating, at a media device, a user profile based on first data received from a portable device. The first data indicates media content sent to a display device of the portable device by an application on the portable device. The method includes recording, via the media device, a media content item from a content source, where the media content item is selected based on the user profile. The method also includes sending the media content item from the media device to the portable device via a local area network. The portable device stores the media content item at a pre-cache memory to enable the portable device to playback the media content item from the pre-cache memory when the portable device is not able to communicate via the local area network.

In an illustrative embodiment, a processor-readable device stores instructions, that when executed by a processor, perform operations. The operations include generating a user profile based on first data received from a portable device. The first data indicates media content sent to a display device of the portable device by an application on the portable device. The operations include recording a media content item from a content source, where the media content item is selected based on the user profile. The operations also include sending the media content item to the portable device via a local area network. The portable device stores the media content item at a pre-cache memory to enable the portable device to playback the media content item from the pre-cache memory when the portable device is not able to communicate via the local area network.

In an illustrative embodiment, a system includes a processor, a memory coupled to the processor, the memory including a pre-cache memory (e.g., a memory particular or memory device designated for pre-caching use), a display device, a local area network interface, and a wireless wide area network interface. The memory stores instructions executable by the processor to perform operations. The operations include sending, to a media device, first data indicating media content provided to the display device during a first time period when a particular local area network was not accessible to the local area network interface. The media device generates a user profile based on the first data and causes a first media content item to be recorded based on the user profile. The operations also include receiving, via the local area network interface from the media device, a notification identifying the first media content item and a storage size associated with the first media content item. The operations further include determining whether the pre-cache memory has capacity available to store the first media content item based on the storage size. The operations also includes, in response to determining that the pre-cache memory does not have capacity available to store the first media content item, deleting a second media content item from the pre-cache memory. The operations further include, after deleting the second media content item, storing the first media content item at the pre-cache memory.

Figure 1:
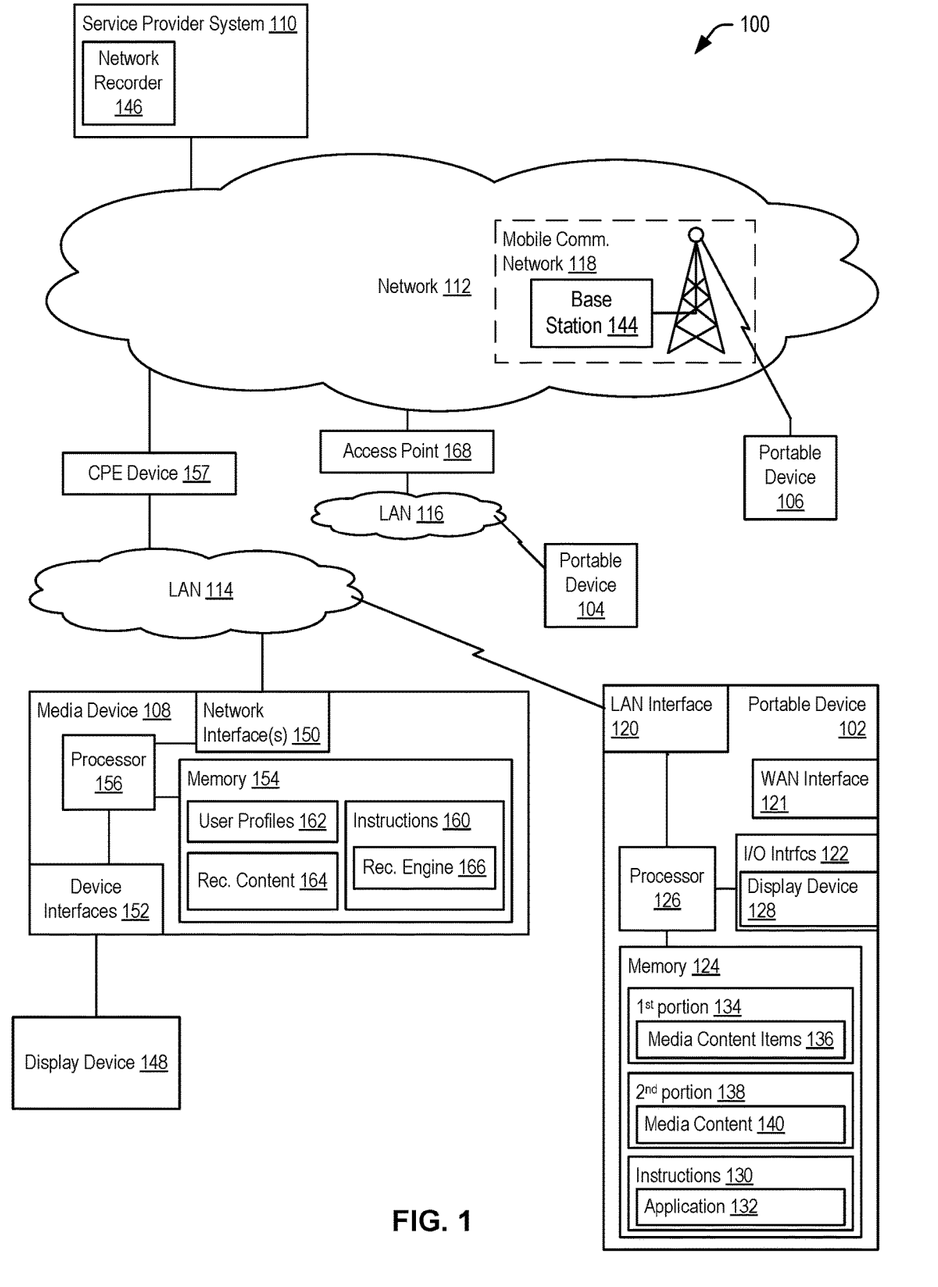
FIG. 1 is a block diagram of a system for providing automatic delivery of media content to a portable device.

FIG. 1 is a block diagram that illustrates a particular embodiment of a system 100 for automatically delivering media content to a portable device, such as one or more of portable devices 102-106. The system 100 depicted in FIG. 1 includes the portable devices 102-106, a media device 108 associated with the portable devices 102-106, and a service provider system 110 associated with the media device 108. In other embodiments fewer or more portable devices 102-106 may be associated with the media device 108, a subscriber (or a particular portable device) may be associated with more than one media device, or combinations thereof.

The portable devices 102-106 may be able to communicate with other devices via one or more networks 112-118. The network 112 may include one or more public networks (e.g., the internet), one or more private networks (e.g., LANs 114, 116), one or more mobile communication networks 118, other networks, or combinations thereof. The portable devices 102-106 may include or correspond to mobile communication devices, smart phones, vehicle-based computing devices (such as an entertainment or communication system within an automobile), tablet or notebook computing devices, wearable computing devices, etc.

The portable device 102 may include multiple network interfaces (such as a local area network (LAN) interface 120 and a wide area network (WAN) interface 121. The LAN interface 120, the WAN interface 121, or both, may be wireless interfaces (e.g., interfaces that transmit and receive data using radiofrequency (RF) signals and corresponding protocols. To illustrate, the LAN interface 120 may be configured to communicate data via the LAN 114, which may be a wireless local area network (e.g., a network compliant with an Institute for Electrical and Electronics Engineers (IEEE) 802.11 standard, such as IEEE 802.11a, IEEE 802.11b, IEEE 802.11g, IEEE 802.11n, etc., or a short-range ad hoc network such as a Bluetooth® network) (BLUETOOTH is a registered trademark of the Bluetooth Special Interest Group). The WAN interface 121 may be configured to communicate data via the mobile communication network 118, which may include or correspond to a 3G network, 4G network, LTE network, another mobile communication network.

The portable device 102 may also include input/output interfaces 122, a memory 124, a processor 126, other components, or combinations thereof. Other portable devices (e.g., the portable device 104, 106) may have the same or similar components, fewer components, or additional components. The network interfaces 120, 121 may enable the portable device 102 to communicate with other devices.

The input/output interfaces 122 may enable user interaction with the portable device 102. The input/output interfaces 122 may include a display device 128, a touch screen, a keyboard, a keypad, a touchpad, a sound system, one or more cameras, one or more haptic devices, other components, or combinations thereof.

The memory 124 may include settings and instructions 130. The settings may include values for various options associated with the portable device 102. The values may be used by the processor 126 in association with the instructions 130. Some or all of the values may be accessed and changed via one or more configuration interfaces. The instructions 130 may include an application 132 that enables playback of media content from the service provider system 110. The memory may include a first portion 134 (e.g., a pre-cache memory) that is dedicated to storing one or more media content items 136. The one or more media content items 136 may include or correspond to recommended media content items automatically (e.g., without user interaction or instruction) pre-cached at the portable device 102 by the media device 108. The memory 124 may include a second portion 138. The second portion 138 may include media content items 140 that is saved at the portable device 102 based on a request from the user. The media content items 140 may include media content items that were originally pre-cached in the first portion 134 and subsequently moved to the second portion 138 based on user input.

The processor 126 may execute the instructions 130 to perform operations. The operations may include receiving media content items from the media device 108, playback content via one of the I/O interfaces 122 for user consumption, tracking data regarding content consumed at the portable device 102, sending control commands to the media device 108, or combinations thereof. The instructions 130 may also be executable by the processor 126 to manage the pre-cache memory (e.g., the first portion 134). To illustrate, when the media device 108 intends to send a media content item to the portable device 102 to be pre-cached, the processor 126 may determine whether the first portion 134 has sufficient available capacity to store the media content item. For example, the media device 108 may send a notification to the portable device 102. The notification may identify the media content item to be stored at the first portion 134 and a size of the media content item.

In this example, the processor 126 may determine, based on the size of the media content item, whether the first portion 134 has sufficient available capacity to store the media content item. If the first portion 134 does not have sufficient available capacity to store the media content item, the processor 126 may free some of the first portion 134 by deleting other content. To illustrate, the processor 126 may delete the oldest media content item stored in the first portion 134.

After the media content items 136 are stored in the memory 124, a user may initiate playback of a particular media content item by selecting the particular media content item via a user interface. For example, the application 132 may be executable by the processor 126 to generate a user interface display that enables a user to select media content items for playback. The user interface display may identify the media content items 136 that are stored in the first portion 134, the media content items 140 that are stored in the second portion 138 of the memory 124 as well as media content items that are not stored at the portable device 102, such as media content items that are available from the service provider via communication over the LAN 114, the network 112 or the mobile communication network 118, or a combination thereof. When the portable device 102 is not able to communicate via a local area network (e.g., the LAN 114), the user interface may identify the media content items 136, 140 that are stored at the portable device 102 (e.g., in the memory 124) more prominently than media content items that are not stored at the portable device 102. For example, the media content items 136, 140 stored at the portable device 102 may be highlighted, and the media content items that are not stored at the portable device 102 may not be highlighted. As another example, the media content items 136, 140 stored at the portable device 102 may be identified on a first (or initial) screen of the user interface, and the media content items that are not stored at the portable device 102 may not be identified on a second (subsequent) screen of the user interface, where more user selections are needed to access the second screen than the first screen. To illustrate, the user may have to scroll past the first screen to access the second screen, may have to access a "more content" option. As yet another example, the media content items 136, 140 stored at the portable device 102 may be listed higher in a menu of available content than the media content items that are not stored at the portable device 102.

When a user consumes (e.g., views, plays back, or accesses) media content using the portable device 102, the portable device 102 (e.g., the processor 126) may store data (e.g., in the memory 124) that identifies the media content and that indicates or can be used to determine whether the portable device 102 was connected to the LAN 114 when the media content was consumed. The portable device 102 may send the data identifying media content consumed at the portable device 102 to the media device 108 or to another device associated with the service provider. As described in more detail below, the media device 108 may generate a user profile based at least in part on the data identifying media content consumed at the portable device 102.

The media device 108 may be associated with the service provider system 110 and with the portable devices 102-106. The media device 108 may be used to retrieve media content from the service provider system 110, to store media content retrieved from the service provider system 110, to cause media content to be stored by a network recorder 146 (e.g. a server computing device) of the service provider system 110, to output retrieved or saved media content to one or more output devices (e.g., one or more display devices 148, a sound system, a haptic device, another device, or combinations thereof), to download media content to one or more of the portable devices 102-106, to perform other functions, or combinations thereof. Although the media device 108 is illustrated in FIG. 1 as be customer premises equipment device, in other implementations, the media device 108 may be a component of a server or other network based computing device at a service provider premises (such as a central office). In such implementations, the display device 148 may communicate with the media device 108 via the LAN 114 and via the network 112.

The media device 108 may include one or more network interfaces 150, one or more device interfaces 152, a memory 154, and a processor 156. Other media devices may have fewer or additional components. The one or more network interfaces 150 may enable the media device 108 to communicate with other devices. For example, the network interfaces 150 may enable the media device 108 to communicate with a customer premises equipment device 157 via the LAN 114. The CPE device 157 may include a satellite dish and receiver, a router, a wireless router, a modem (e.g., a digital subscriber line modem or a cable modem), a residential gateway, another communication device, or combinations thereof. The CPE device 157 may facilitate communications between the media device 108 and the service provider system 110. The CPE device 157 may also facilitate communication between the media device 108 and the portable devices 102-106 via the LAN 114, the network 112, or both.

The device interfaces 152 may enable user interaction with the media device 108. The device interfaces 152 may enable the media device 108 to communicate with output devices (e.g., the display device 148), input devices (e.g., a remote control device), or both.

The memory 154 may include settings, instructions 160, user profiles 162, recommended content 164, other content, other data, or combinations thereof. The settings may include values for various options associated with the media device 108. The instructions 160 may be executable by the processor 156 to perform operations. The instructions 160 may enable the processor 156 to generate (e.g., create, update, or both) the user profiles 162. The instructions 160 may also include a recommendation engine 166 that is executable to generate content recommendations (e.g., a list of recommended media content items) based on the user profiles 162. The recommended content 164 may include one or more media content items identified in the content recommendations. In some embodiments, the recommended content 164 may be stored at a network recorder rather than at the media device 108 (such as when the media device 108 utilizes the network recorder 146 to record media content).

In some implementations, each portable device 102-106 is associated with a respective user. For example, the portable device 102 may be associated with a first user, the portable device 104 may be associated with a second user, and the portable device 106 may be associated with a third user. In this example, each of the users (and each of the portable devices 102-106) may be associate with a respective user profile of the user profiles 162. Each user's user profile may be generated based on the user's interactions with the media device 108 and his or her respective portable device. To illustrate, a first user profile associated with the first user may be generated based on media content that the first user consumes via the media device (with or without other users) and media content that the first user consumes using the portable device 102. The user profile may include information usable by the recommendation engine 166 to predict available media content that will be of interest to the user.

A user of a particular portable device (e.g., one of portable devices 102-106) may install the application 132 to the particular portable device. When the portable device 102 is connected to the LAN 114, the application 132 may enable the portable device 102 to detect the media device 108 and may display an interface that enables the portable device 102 to control at least some functions of the media device 108. To illustrate, the portable device 102 may function as a remote control device for the media device 108. The interface may also enable the user to set or modify settings associated with the portable device 102 (e.g., how much of the memory 124 is to be identified as the first portion 134) or settings associated with the media device 108 (e.g., to turn on or turn off the recommendation engine 166 or enable or disable the media device 108 to pre-cache media content at the portable device 102). Additionally, an identifier of the portable device 102 (e.g., a media access control (MAC) address of the portable device 102) may be stored in the settings of the media device 108, and an identifier of the media device 108 (e.g., a MAC address of the media device 108) may be stored in the settings of the portable device 102. Using the identifier of the media device 108, the portable device 102 may be able to determine whether the portable device 102 is able to communicate with the media device 108 (e.g., via that LAN 114). Likewise, the identifier of the portable device 102, the media device 108 may be able to determine whether the media device 108 is able to communicate with the portable device 102 (e.g., via that LAN 114).

The media device 108 may process data received from the portable device 102 to generate a user profile of the user profiles 162. The data received from the portable device 102 may include data (e.g., first data) that corresponds to or identifies media content retrieved from the memory 124 and sent to a display device of the portable device 102 by the application 132, data (e.g., second data) that corresponds to or identifies media content items retrieved by the portable device 102 via a wide area network (e.g., the mobile communication network 118), data (e.g., third data) that corresponds to or identifies media content items consumed (via the media device 108 or via that portable device 102) while the portable device 102 was connected to the local area network, data (e.g., fourth data) that corresponds to or identifies media content items consumed via the media device 108 without input (e.g. control signals) from the portable device 102, or a combination of such data. The third data may indicate control signals sent from the portable device 102 to the media device 108. Alternately or in addition, the third data may identify media content that was displayed (or otherwise consumed) using an output (e.g., a display) of the portable device 102 while the portable device 102 was connected to the LAN 114. The fourth data may correspond to media that the user consumed while controlling the media device 108 using a traditional remote control rather than the portable device 102. In some cases, the fourth data may be a subset of the third data.

In some embodiments, when generating the user profile associated with the portable device 102, the media device 108 may assign a different weights to different types of data received from the portable device 102. For example, the media device 108 may apply a first weighting to the first data to generate first weighted data, applying a second weighting to the second data to generate second weighted data, applying a third weighting to the third data to generate third weighted data, applying a fourth weighting to the fourth data to generate fourth weighted data, or a combination thereof. In this example, the weighted data may be used to generate the user profile or to generate media consumption predictions associated with the portable device 102.

In a particular example, the media device 108 may generate media consumption predictions indicating which media content the user of the portable device 102 is likely to consume within a particular period of time. For example, the media device 108 may access a program listing (such as an electronic program guide) that identifies programs that are to be available to the media device (e.g., as pay-per-view, video-on-demand, or broadcast content) within a time period associated with the program listing (e.g., within about two weeks). Then based on content that the user has recently or historically consumed, the media device 108 (e.g., the recommendation engine) may rank, rate or otherwise evaluate programs of the program listing to generate program recommendations (e.g., a list of programs that the user is likely to consume). Some or all of the programs of the program recommendation may be scheduled for recording, e.g., at the memory 154 of the media device 108 as recommended content 164, or at a network recorder. Depending on the settings of the media device 108, the recommended content 164 may be scheduled for recording (and subsequently recorded) recorded automatically (e.g., without user input). At least some of the recommended content 164 may identified (e.g., tagged) for pre-caching at the portable device 102. For example, programs that the user is expected to consume while the portable device 102 is not connected to the LAN 114 may be selected for pre-caching at the portable device 102. The recommendation engine 166 may identify the media content items to pre-cache at the portable device based on which media content items the user consumed from the memory 124 of the portable device and which media content items the user consumed by accessing the media content items via the mobile communication network 118. Thus, the recommendation engine 166 may use the data received from the portable device 102 to attempt to predict which media content items the user is likely to consume using the portable device 102, especially which media content items the user is likely to consume using the portable device 102 while the portable device 102 is not connected to the LAN 114. If the recommendation engine 166 successfully predicts that the user will consume a particular media content item while the portable device 102 is not connected to the LAN 114, the particular media content item may be pre-cached at the first portion 134 of the memory 124. Accordingly, when the user attempts to playback the particular media content item, no bandwidth of the mobile communication network 118 is used to provide the particular media content item to the portable device 102. Additionally, the user does not experience delay associated with accessing the particular media content item via the mobile communication network 118.

The media device 108 may periodically or occasionally generate or update the program recommendations. To illustrate, the program recommendations may be update daily or weekly, or in response to an event, such as in response to receiving an updated electronic program guide or in response to detecting that the portable device 102 is connected to the LAN 114 after a period when the portable device 102 was not connected to the LAN 114. A number of entries in the program recommendations may be limited to a particular number based on user input, based on a frequency of list generation, based on a storage capacity of the media device 108 or of the portable device 102, based on other factors, or combinations thereof.

The media device 108 may record programs identified in the program recommendations at a scheduled times (e.g., for broadcast content, when each program is broadcast). After recording a particular media content item, the media device 108 may determine whether the particular media content item is to be pre-cached at the portable device 102. If the particular media content item is to be pre-cached at the portable device 102, the media device 108 may determine whether the portable device 102 is accessible via the LAN 114. If the portable device 102 is accessible via the LAN 114, the media device 108 may send a notification to the portable device 102. The notification may inform the portable device 102 of the media content item and a storage size associated with the media content item.

In response to the first notification, the portable device 102 may determine whether the first portion 134 of the memory 124 has sufficient available space for the media content item. If there is insufficient space for the media content item, the portable device 102 may delete one or more media content items 136 in the first portion 134 to make space available for the media content item. The one or more media content items 136 to be deleted may be chosen based on a first-in-first-out criterion, based on a different criterion, or both. After sufficient space in the first portion 134 is created, or when there was sufficient space for the media content item without deleting the one or more media content items 136, the particular portable device may send a media request for the media content item to the media device 108.

In response to the media request from the portable device 102, the media device 108 may send the media content item to the portable device 102 (e.g., via the LAN 114). If the media content item is stored at a network recorder rather than at the media device 108, the media device 108 may instruct the network recorder to send the media content item to the portable device 102. The media device 108 may also cause the media content item to be pre-cached at one or more other portable devices 104, 106. After the media content item has been sent to all devices that are to receive the media content item, the media device 108 may cause the media content item to be deleted from the media device 108 or the network recorder 146.

Thus, the system 100 of FIG. 1 enables automatic delivery of media content to a portable device (e.g., one or portable devices 102-106) from a media device 108 based on a user profile associated with the portable device. The media content may be used in association with an application on the portable device. Automatically delivering the media content may enable the portable device to pre-cache one or more media content items that may be of interest to the user without the need for the user to go through a process of manually selecting and downloading content for later viewing to the particular portable device. Additionally, automatically pre-caching media content that the user is likely to view while away from home (e.g., while the portable device is not able to connect to the LAN) may conserve bandwidth of the mobile communication network that would be used to transmit the media content. Further, the media content pre-cached at the portable device may be consumed with fewer delays that would be associated with retrieving the media content via the mobile communication network.

Figure 2:
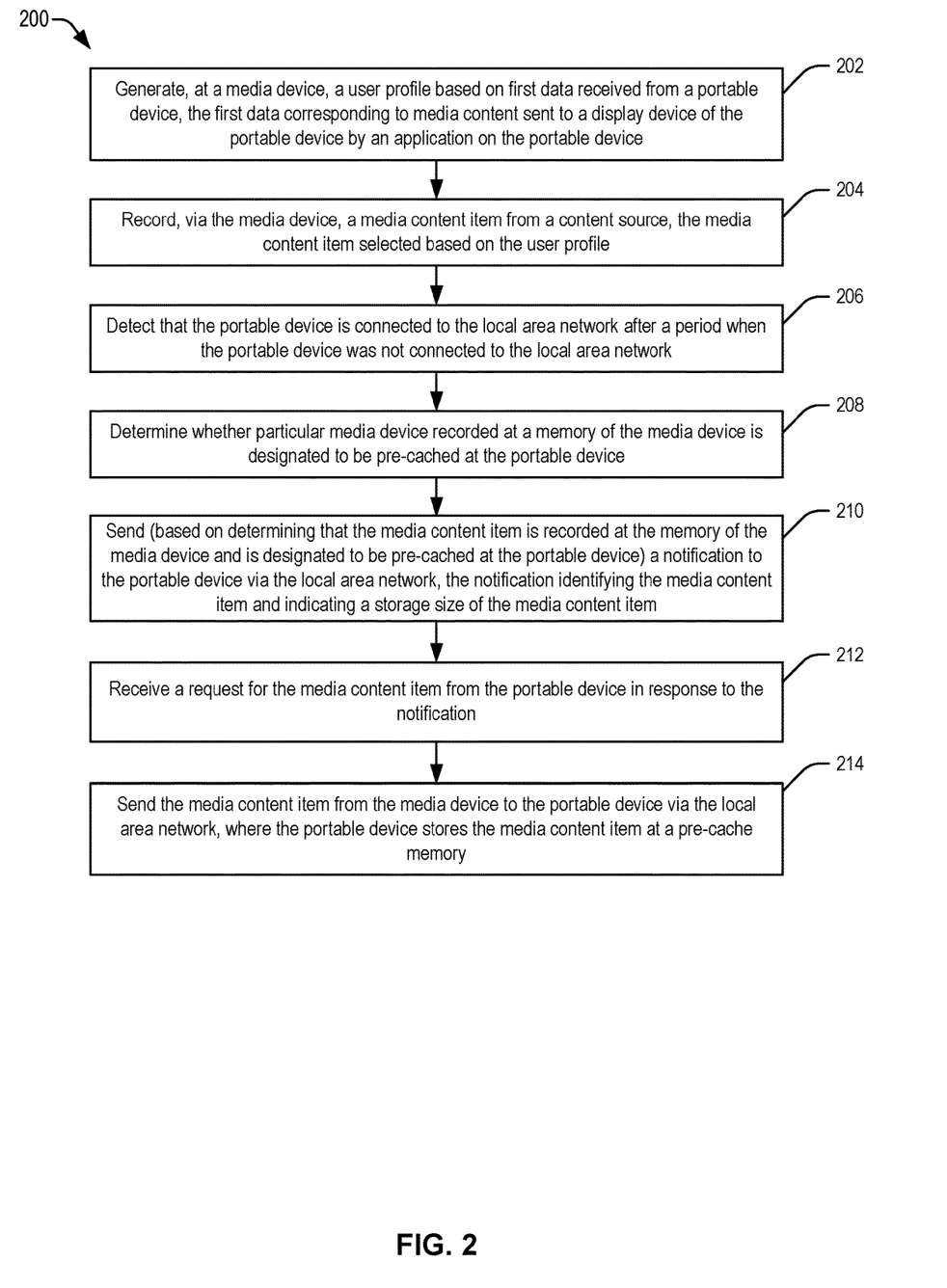
FIG. 2 is a flowchart of a particular embodiment of a method for automatic delivery of personalized media content to a portable device.

Referring to FIG. 2, a flowchart of a particular embodiment of a method 200 for automatic delivery of personalized media content to a portable device is shown. The method 200 may be performed by the media device 108 of FIG. 1.

The method 200 includes, at 202, generating, at the media device, a user profile based on first data received from a portable device. For example, the portable device may send the media device data indicating media content consumed using the portable device (e.g., where the portable device outputs the media content for consumption, where the portable device controls the media device while the media device outputs the media content, or both). In a particular embodiment, the first data corresponds to media content sent to a display device of the portable device by an application on the portable device. The first data may be received with other data, such as second data that identifies or corresponds to media content items retrieved by the portable device via a wide area network, third data that identifies or corresponds to media content items consumed when the portable device was connected to the local area network (e.g., control data corresponding to user input that controls the media device), fourth data corresponds to media content items consumed via the media device without input from the portable device, or a combination thereof.

The data may include or correspond to usage data associated with a user of the portable device. For example, the data may correspond to use of an application (e.g., the application 132 of FIG. 1) that enables playback of media content. The data may identify media content selected by the user for playback (either at the portable device or at the media device), temporal information associated with playback of the media content selected for playback, information about continued use of the application after the playback of particular media content stopped, information about whether the user subsequently selected the media content again, other information, or combinations thereof.

The data may be used by the media device to generate the user profile associated with the portable device. Generating the user profile may include creating the user profile and subsequently updating the user profile based on additional data received from the portable device. In some embodiments, the user profile is based only on the data associated with the application that is received from the portable device.

The user profile may indicate trends, preferences, dislikes, and other information inferred based on the data or expressly indicated (e.g., based on a user selection) in the data. For example, a particular user profile may include information based on the data that indicates that the user selects children's programming on certain days of the week and on certain weekends. As another example, a particular user profile may include information based on the data that indicates that the user tends to view a particular program while away from home (e.g., during a morning commute) by streaming the particular program via a mobile communication network.

The user profile may be used by a recommendation engine (e.g., a recommendation engine of the media device or a recommendation engine hosted by a network device such as a server) to recommend programs for the media device to record, to recommend programs for the media device to record and pre-cache at the portable device, or both. For example, the recommendation engine may use a particular user profile to recommend recording of a particular children's program on a Friday of a week where the portable device is likely to play the children program on the weekend of the week so that the children's program is available to be downloaded to the portable device. As another example, the recommendation engine may recommend that the media device record and pre-cache a particular program that the user typically streams via the mobile communication network.

The recommendation engine may provide the media device with a list of one or more recommended programs to record at particular times (e.g., every day, every other day, once a week, or at some other time interval) or when requested by the media device. The media device may request a recommended program when the application informs the media device that the user deleted media content from a portion of the memory of the portable device dedicated to the application. The recommendation engine may choose the one or more recommended programs from available programs included in content of an electronic program guide. The media device may schedule recording of at least one of the one or more recommended programs.

The method 200 may include, at 204, recording a media content item from a content source, at 204. The media content item recorded may be selected based on the user profile by the recommendation engine. The media content item may be a recommended program of the one or more recommended programs. The content source may be a media distribution system associated with the content provider, an over-the-air broadcaster, or another source.

The method 200 may also include, at 206, detecting (at the media device) that the portable device is connected to the local area network after a period when the portable device was not connected to the local area network. For example, when a user arrives home at the end of a day, the portable device associated with the user may automatically establish a connection with the local area network (or with the media device via the local area network). A wireless access point that supports the local area network may notify the media device that the portable device connects to the local area network. In another example, the media device may support (e.g., function as an access point for) the local area network. In this example, connecting to the local area network includes establishing a connection between the portable device and the media device.

The method 200 may include, at 208, determining (at the media device) whether particular media content recorded at a memory of the media device is designated to be pre-cached at the portable device. The method 200 may also include, at 210, sending (based on determining that the media content item is recorded at the memory of the media device and is designated to be pre-cached at the portable device) a notification to the portable device via the local area network. The notification may identify the media content item to be pre-cached at the portable device and a storage size associated with the media content item.

In response to the notification, the portable device may determine whether the portable device has sufficient available capacity in a pre-cache memory to store the media content item. When the portable device does not have sufficient available capacity in the pre-cache memory, the portable device may delete one or more programs from the pre-cache memory to free sufficient space for the media content item. When the portable device has sufficient available capacity in the pre-cache memory for the media content item, the portable device may send a request for the media content item to the media device.

The method 200 may include, at 212, receiving the request for the media content item from the portable device in response to the notification. The method 200 may also include, at 214, sending the media content item from the media device to the portable device via the local area network after receiving the request. The portable device may store the media content item at a pre-cache memory.

Thus, the method 200 of FIG. 2 enables the media device to automatically send recommended media content to a portable device when the portable device is accessible to the media device via a local area network. Pre-caching the recommended media content at the portable device may improve user satisfaction since the media content is immediately available for consumption by the user with the user manually downloading the media content.

Figure 3:
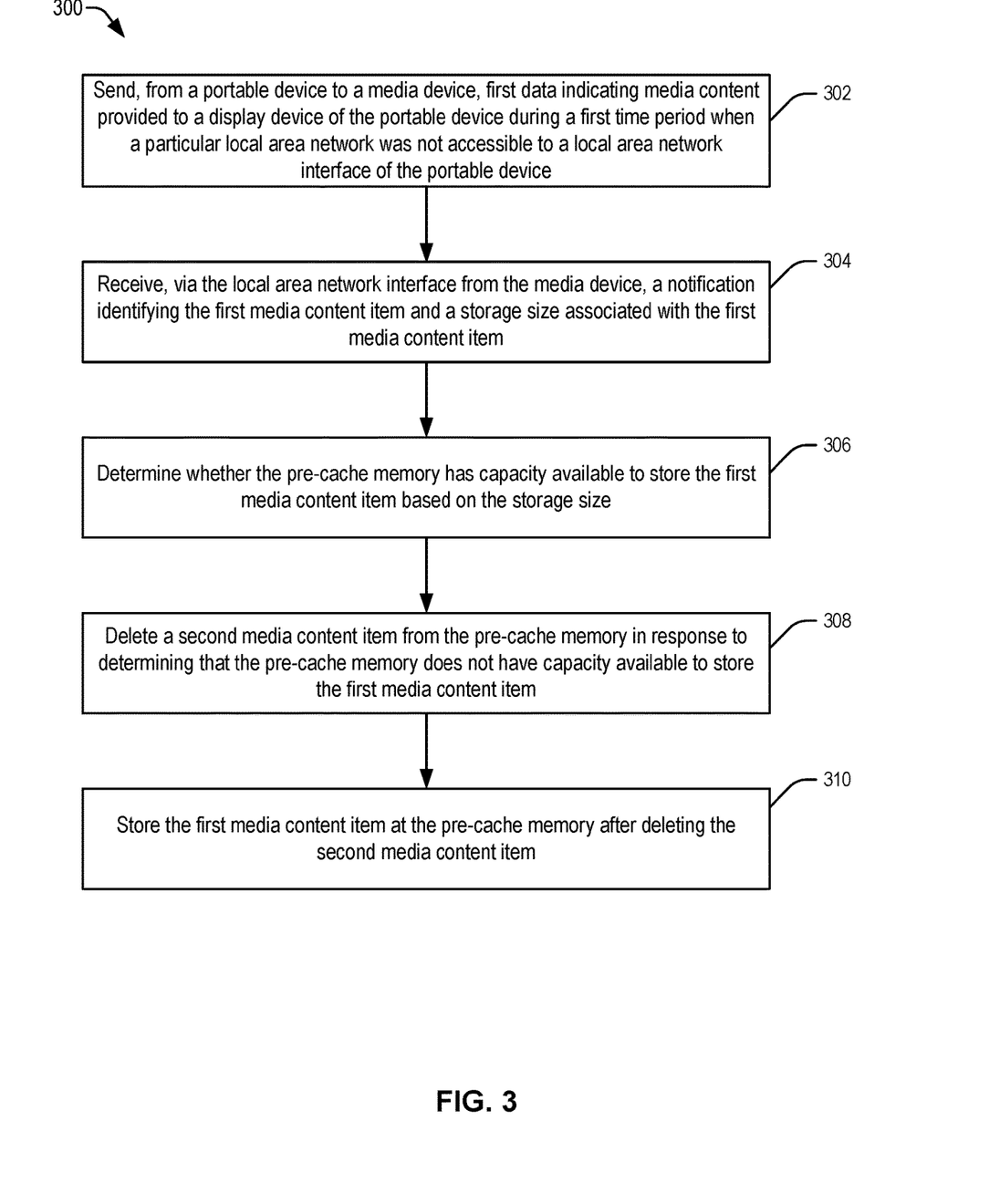
FIG. 3 is a flowchart of a particular embodiment of a method for automatic pre-caching of media content at a portable device.

Referring to FIG. 3, a flowchart of a particular embodiment of a method 300 for automatic pre-caching of media content at a portable device is shown. The method 300 may be performed by a portable device (e.g., one of portable devices 102-106 of FIG. 1). The method 300 includes, at 302, sending, from the portable device to a media device, first data indicating media content provided to a display device of the portable device during a first time period when a particular local area network was not accessible to a local area network interface of the portable device. The media device may generate a user profile based on the first data (and possibly based on other data) and causes a first media content item to be recorded based on the user profile.

The method 300 also includes, at 304, receiving, via the local area network interface from the media device, a notification identifying the first media content item and a storage size associated with the first media content item. The method 300 further includes, at 306, determining whether a pre-cache memory of the portable device has capacity available to store the first media content item based on the storage size. In response to the portable device determining that the pre-cache memory does not have capacity available to store the first media content item, the method 300 may include, at 308, deleting a second media content item from the pre-cache memory. If the pre-cache memory has capacity available to store the first media content or after deleting the second media content item to make capacity available, the method 300 includes, at 310, storing the first media content item at the pre-cache memory.

In some embodiments, the first data identifies first media content items accessed from the pre-cache memory for playback. In such embodiments, the method 300 may also include sending second data from the portable device to the media device. The second data may identify second media content items retrieved by the portable device via the wide area network interface during a first time period (e.g., when the portable device was not connected to the particular local area network). The media device may generate the user profile based further on the second data.

In some embodiments, the method 300 may also, or in the alternative, include sending third data from the portable device to the media device. The third data may identify third media content items consumed while the local area network interface of the portable device was connected to the particular local area network. For example, the third data may be based on control data corresponding to control signals sent via the local area network interface to the media device to control media playback by the media device. The media device may generate the user profile based further on the third data.

In some embodiments, the method 300 may include during a time period after storing the first media content item at the pre-cache memory and when the local area network interface is not connected to the particular local area network, providing a user interface to the display device. The user interface may identify media content items that are available using the portable device. For example, the available media content may include the first media content item and a second media content item that is not stored in the pre-cache memory. In this example, a first option to playback the first media content item may be more prominently displayed in the user interface than a second option to playback the second media content item. Additionally or in the alternative, in this example, in response to user selection of a first option to playback the first media content item, the method may include retrieving the first media content item from the pre-cache memory, processing the first media content item for display at the display device, and generating first data indicating consumption of the first media content item during a particular time period when the local area network interface is not connected to the particular local area network. Further, in this example, the method 300 may include, in response to user selection of a second option to playback the second media content item, retrieving the second media content item via the wide area network interface, processing the second media content item for display at the display device, and generating second data indicating retrieval of the second media content item via the wide area network interface.

In some embodiments, the method 300 may also include, during a second time period when the local area network interface is connected to the particular local area network, providing a second user interface to the display device. The second user interface may include a plurality of selectable options to control media playback by the media device. In such embodiments, the method 300 may also include, in response to user selection of a selectable option of the plurality of selectable options, sending a control signal to the media device via the local area network interface or via another interface. The media device may generate the user profile based further on the control signal.

Thus, the method 300 of FIG. 3 enables pre-caching of media content at a portable device. The portable device may automatically make storage space available for media content item by deleting other media content items. The media content item may include content recommended for pre-caching at the portable device based on a user profile. Pre-caching the media content item may enable the portable device to provide media content of interest to the user while the user is away from home (e.g., when the portable device is not connected to the local area network) without retrieving the media content via a mobile communication networks.

Various embodiments disclosed herein describe automatic pre-caching of media content at a portable device from a media device. The media content may be selected for pre-caching based on a user profile associated with the portable device. The user profile may be generated based on usage data received from the portable device, such as data indicating usage of an application at the portable device. The application may include or correspond to a media playback application that is associated with a service provider that provides media content services to the portable device. Basing the user profile on the data from the portable device may enable the media device to recommend media content that is likely to be viewed by the user. To encourage consumption of pre-cached media content while the portable device is connected to relatively high cost network (such as a mobile communication network) selectable options associated with pre-cached content may be more prominently displayed than selectable options associated with content that would be provided (e.g., streamed or downloaded) via the high cost network. Playback of the pre-cached media content may be higher quality, and more reliable (e.g., less subject to service interruptions) than playback of the same media content via the mobile communication network. The media content may be delivered to the portable device for pre-caching via a relative low cost network, such as a local area network associated with the media device. Thus, pre-caching the media content may relieve bandwidth utilization of the mobile communication network. Also, the media content pre-cached at the portable device may be changed automatically (e.g., without requiring input from the user), thus providing a variety of media content for selection by the user without inconveniencing the user.

Figure 4:
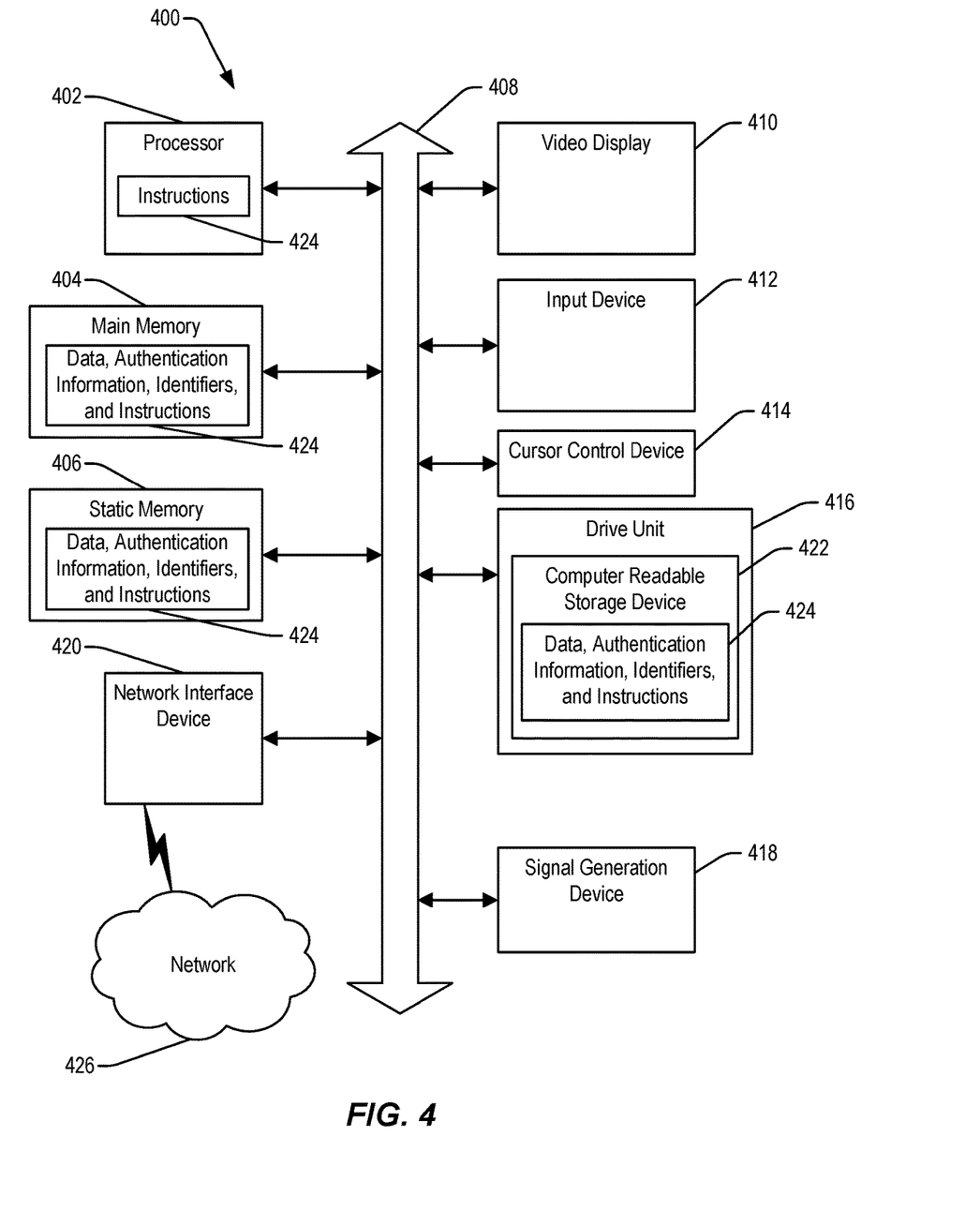
FIG. 4 is a block diagram of an illustrative embodiment of a general computer system.

Referring to FIG. 4, an illustrative embodiment of a general computer system is shown and is designated 400. The computer system 400 includes a set of instructions (e.g., the instructions 424 in the memory 404) that can be executed to cause the computer system 400 to perform any one or more of the methods or computer based functions disclosed herein. The computer system 400 may operate as a standalone device or may be connected (e.g., using a network) to other computer systems or peripheral devices. For example, the computer system 400 may include or may be included within any one or more of the portable devices 102-106, the media device 108, the service provider system 110, the base station 144, the display device 148, the access point 168, or combinations thereof, described with reference to FIG. 1.

In a networked deployment, the computer system 400 may operate in the capacity of a server or as a client user computer in a server-client user network environment, or as a peer computer system in a peer-to-peer (or distributed) network environment. The computer system 400 may also be implemented as or incorporated into various devices, such as a server, a network device, a mobile device, a palmtop computer, a laptop computer, a desktop computer, a communications device, a wireless telephone, a personal computer (PC), a tablet PC, a personal digital assistant (PDA), a set-top box (STB) device, a media playback device, a customer premises equipment device, an endpoint device, a web appliance, or any other machine capable of executing a set of instructions (sequential or otherwise) that specify actions to be taken by that machine. In a particular embodiment, the computer system 400 may be implemented using electronic devices that provide video, audio, data communication, or combinations thereof. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402 (e.g., a central processing unit (CPU), a graphics processing unit (GPU), or both). Moreover, the computer system 400 may include a main memory 404 and a static memory 406, which can communicate with each other via a bus 408. As shown, the computer system 400 may further include a video display unit 410, such as a liquid crystal display (LCD), a light emitting diode (LED) display, a touch screen display, a flat panel display, a solid state display, or a lamp assembly of a projection system. Additionally, the computer system 400 may include an input device 412, such as a remote control device (e.g., a television remote or a set-top box remote), a keyboard, a joystick, another type of input device, or combinations thereof. In addition, the computer system 400 may include a cursor control device 414 (e.g., a mouse). In some embodiments, the input device 412 and the cursor control device 414 may be integrated into a single device, such as a capacitive touch screen input device. The computer system 400 may also include a drive unit 416, a signal generation device 418, such as a speaker or remote control, and a network interface device 420. Some computer systems 400 may not include an input device (e.g., a server may not include an input device).

In a particular embodiment, as depicted in FIG. 4, the drive unit 416 may include a computer-readable storage device 422 in which authentication information, identifiers, and one or more sets of instructions 424, e.g. software, can be embedded. The computer-readable storage device 422 may be random access memory (RAM), read-only memory (ROM), programmable read-only memory (PROM), erasable PROM (EPROM), electrically erasable PROM (EEPROM), one or more registers, solid-state memory, one or more hard disks, one or more removable disks, compact disc read-only memory (CD-ROM), other optical disk storage, magnetic disk storage, magnetic storage devices, or any other storage device usable to store program code in the form of instructions or data and that can be accessed by a computer and/or a processor. A computer-readable storage device is not a signal.

Further, the instructions 424 may embody one or more of the methods or logic as described herein. The instructions 424 may be executable by the processor 402 to perform one or more functions or methods described herein, such as the methods 200 of FIG. 2 or the method 300 of FIG. 3. In a particular embodiment, data (e.g., information corresponding to a media content item), authentication information, identifiers, and instructions (e.g., a request for the media content item) 424 may reside completely, or at least partially, within the main memory 404, the static memory 406, and/or within the processor 402 during execution by the computer system 400. The main memory 404 and the processor 402 also may include a computer-readable storage device. The authentication information included in the authentication information, identifiers, and instructions 424 in the drive unit 416, the main memory 404, the static memory 406, the processor 402, or combinations thereof may be transmitted to another computer system to enable authentication of the computer system 400, and the identifiers may include a list of identifiers used to authenticate the other computer system, prior to sharing a resource with the other computer system.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality described herein. It is further noted that a computing device, such as a processor, a controller, a state machine or other suitable device for executing instructions to perform operations may perform such operations directly or indirectly by way of one or more intermediate devices directed by the computing device.

The computer system 400 may communicate with one or more external systems via a network 426. First data stored by the computer-readable storage device 422 may be sent to the one or more external systems via the network 426. Also, second data may be received by the computer system 400 via the network 426. The second data may be stored by the processor 402 at the computer-readable storage device. Additionally, while the computer-readable storage device 422 is shown to be a single device, the computer-readable storage device 422 may be a single device or may be multiple devices, such as a centralized or distributed database, and/or associated caches and servers that store one or more sets of instructions. The computer-readable storage device 422 is capable of storing a set of instructions for execution by the processor 402 to cause the computer system 400 to perform any one or more of the methods or operations disclosed herein.

In a particular non-limiting, exemplary embodiment, the computer-readable storage device 422 may include a solid-state memory such as embedded memory (or a memory card or other package that houses one or more non-volatile read-only memories). Further, the computer-readable storage device 422 may include a random access memory or other volatile re-writable memory. Additionally, the computer-readable storage device 422 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for short-range communications and long-range communications can be used by the computer system 400 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   generating, at a media device, a user profile based on first data received from a portable device, the first data corresponding to media content sent to a display device of the portable device by an application on the portable device;
   causing, via the media device, a media recorder to make a recording of a media content item from a content source, the media content item selected by the media device based on the user profile;
   in response to making the recording, initiating, by the media device, a push operation to automatically send the recording of the media content item from the media recorder to the portable device via a local area network, wherein the portable device stores the recording of the media content item at a pre-cache memory to enable the portable device to playback the recording from the pre-cache memory at a later time when the portable device is not connected to the local area network; and
   responsive to sending the recording to the portable device, causing, via the media device, deletion of the recording made by the media recorder.

2. The method of claim 1, further comprising, before sending the recording to the portable device:
   detecting that the portable device is connected to the local area network after a prior time period when the portable device was not connected to the local area network;
   based on determining that the recording is designated to be pre-cached at the portable device, sending a notification to the portable device via the local area network, the notification identifying the recording and indicating a storage size of the recording; and
   receiving a request for the recording from the portable device in response to the notification, wherein the recording is sent to the portable device in response to the request.

3. The method of claim 1, wherein the first data identifies first media content items sent to the display device of the portable device during a first time period when the portable device was not connected to the local area network.

4. The method of claim 3, wherein the user profile is generated based further on second data received from the portable device, wherein the second data identifies second media content items retrieved by the portable device via a wide area network during the first time period, the wide area network distinct from the local area network.

5. The method of claim 3, wherein the user profile is generated based further on third data received from the portable device, wherein the third data corresponds to third media content items consumed when the portable device was connected to the local area network.

6. The method of claim 5, wherein the third data is based on control data, the control data corresponding to user input that controls the media device, the user input received at the portable device during use of the application.

7. The method of claim 1, wherein the media device designates the portable device and a second portable device to receive the recording based on the user profile, and further comprising causing, via the media device, the recording to be sent to the second portable device before deletion of the recording made by the media recorder.

8. The method of claim 1, wherein the media device comprises a network server associated with a service provider, a customer premises device, a set-top box device, a television, or a combination thereof.

9. A processor-readable storage device storing instructions that, when executed by a processor, cause the processor to perform operations comprising:
   generating, at a media device, a user profile based on first data received from a portable device, the first data corresponding to media content sent to a display device of the portable device by an application on the portable device;
   causing a media recorder to make a recording of a media content item from a content source, the media content item selected based on the user profile;
   in response to making the recording, initiating a push operation to automatically send the recording from the media recorder to the portable device via a local area network, wherein the portable device stores the recording at a pre-cache memory to enable the portable device to playback the recording from the pre-cache memory at a later time when the portable device is not connected to the local area network; and
   responsive to sending the recording to the portable device, causing deletion of the recording made by the media recorder.

10. The processor-readable storage device of claim 9, wherein the operations further comprise:
   receiving, from the portable device, the first data, second data, and third data, wherein the first data identifies first media content items sent to the display device of the portable device during a first time period when the portable device was not connected to the local area network, wherein the second data identifies second media content items retrieved by the portable device via a wide area network during the first time period, wherein the third data corresponds to third media content items consumed during a second time period when the portable device was connected to the local area network;
   determining fourth data at the media device, the fourth data corresponds to fourth media content items consumed via the media device without input from the portable device, wherein the user profile is generated by:
      applying a first weighting to the first data to generate first weighted data;
      applying a second weighting to the second data to generate second weighted data;
      applying a third weighting to the third data to generate third weighted data; and
      applying a fourth weighting to the fourth data to generate fourth weighted data; and
   selecting the media content item for the portable device based on media consumption prediction scores for available media content, the media consumption prediction scores determined based on the first weighted data, the second weighted data, the third weighted data, and the fourth weighted data.

11. The processor-readable storage device of claim 9, wherein causing the media recorder to make the recording comprises sending a recording request to a network recorder.

12. The processor-readable storage device of claim 11, wherein causing the recording to be sent to the portable device comprises sending a delivery request to the network recorder, wherein the delivery request specifies that the portable device is to receive the recording.

13. The processor-readable storage device of claim 9, wherein the operations further comprise sending a notification of availability of the recording to the portable device, the notification identifying the recording and a storage size of the recording.

14. A media device comprising:
   a processor; and
   a memory coupled to the processor, the memory storing instructions executable by the processor to perform operations including:
      generating a user profile based on first data received from a portable device, the first data corresponding to media content sent to a display device of the portable device by an application on the portable device;
      causing a media recorder to make a recording of a media content item from a content source, the media content item selected based on the user profile;
      in response to making the recording, initiating a push operation to automatically send the recording from the media recorder to the portable device via a local area network, wherein the portable device stores the recording at a pre-cache memory to enable the portable device to playback the recording from the pre-cache memory at a later time when the portable device is not connected to the local area network; and
      responsive to sending the recording to the portable device, causing deletion of the recording made by the media recorder.

15. The media device of claim 14, wherein the media recorder comprises additional instructions stored to the memory and executable by the processor.

16. The media device of claim 14, wherein the media recorder comprises a network media recorder.

17. The media device of claim 14, wherein the operations further include:
   receiving, from the portable device, the first data, second data, and third data, wherein the first data identifies first media content items sent to the display device of the portable device during a first time period when the portable device was not connected to the local area network, wherein the second data identifies second media content items retrieved by the portable device via a wide area network during the first time period, wherein the third data corresponds to third media content items consumed during a second time period when the portable device was connected to the local area network, wherein the user profile is generated by:

applying a first weighting to the first data to generate first weighted data;

applying a second weighting to the second data to generate second weighted data; and applying a third weighting to the third data to generate third weighted data; and selecting the media content item for the portable device based on media consumption prediction scores for available media content, the media consumption prediction scores determined based on the first weighted data, the second weighted data, and the third weighted data.

18. The media device of claim 17, wherein the available media content is determined from an electronic program guide.

19. The media device of claim 14, wherein the operations further include:

determining, by a recommendation engine and based on a search of a program guide, whether the media content item is available or is scheduled to be available; and receiving a recommendation of the media content item from the recommendation engine in response to a determination that the media content item is available or is scheduled to be available.

20. The media device of claim 19, wherein the operations further include selecting, by the recommendation engine, the media content item based on the user profile indicating media content accessed by the portable device while the portable device is connected to a wide area network instead of to the local area network.

* * * * *